United States Patent [19]

Kim et al.

[11] Patent Number: 4,666,775

[45] Date of Patent: May 19, 1987

[54] PROCESS FOR SINTERING EXTRUDED POWDER SHAPES

[75] Inventors: Jonathan J. Kim, Williamsville; Viswanathan Venkateswaran, Grand Island, both of N.Y.

[73] Assignee: Kennecott Corporation, Cleveland, Ohio

[21] Appl. No.: 815,981

[22] Filed: Jan. 3, 1986

Related U.S. Application Data

[63] Continuation-in-part of Ser. No. 718,374, Apr. 1, 1985, and a continuation-in-part of Ser. No. 718,375, Apr. 1, 1985, and a continuation-in-part of Ser. No. 718,376, Apr. 1, 1985.

[51] Int. Cl.$^4$ .................................................. D02G 3/00
[52] U.S. Cl. ........................................ 428/398; 219/61;
  219/121 P; 264/65; 264/209.1; 266/257;
  373/18
[58] Field of Search ................. 373/18; 219/61, 121 P;
  266/257; 264/65, 209.1; 428/398

[56] References Cited

U.S. PATENT DOCUMENTS

| Re. 30,286 | 5/1980 | Coppola et al. ................ 264/65 |
| 3,432,296 | 3/1969 | McKinnon et al. ................ 75/214 |
| 3,935,371 | 1/1976 | Camacho et al. ................ 219/121 P |
| 3,970,290 | 7/1976 | Santen et al. ................ 266/138 |
| 4,004,934 | 1/1977 | Prochazka ................ 264/65 |
| 4,041,117 | 8/1977 | Prochazka ................ 264/65 |
| 4,179,299 | 12/1979 | Coppola et al. ................ 106/44 |
| 4,190,439 | 2/1980 | Gortsema ................ 419/30 |
| 4,353,885 | 10/1982 | Hoekje ................ 264/63 |
| 4,381,931 | 5/1983 | Hunold et al. ................ 419/2 |
| 4,390,773 | 6/1983 | Esser et al. ................ 219/121 PR |
| 4,462,792 | 7/1984 | Roth et al. ................ 432/11 |
| 4,490,319 | 12/1984 | Lee et al. ................ 264/65 |

FOREIGN PATENT DOCUMENTS 0032100 12/1980 European Pat. Off. .
2510986 8/1982 France .

OTHER PUBLICATIONS

"Test Furnace Achieves 2200° C. (4000° F.) in Air, Inert Atmospheres", presented by Harper Electric Furnace Corp., Harper Highlights, vol. 5, No. 1, Spring 85.

*Primary Examiner*—Stephen J. Lechert, Jr.
*Attorney, Agent, or Firm*—Pahl, Lorusso & Loud

[57] ABSTRACT

An improved process for sintering extruded powder shapes comprising drying or calcining an extruded shape in a microwave furnace and rapid sintering the shape in a plasma fired furnace. Alternatively, calcining or drying may take place within a furnace heated by the plasma furnace's exhaust. The process of the invention is especially useful for silicon carbide extruded materials and for tubular shapes. This process significantly reduces sintering times and costs. Use of the process yields a high strength sintered product.

28 Claims, 1 Drawing Figure

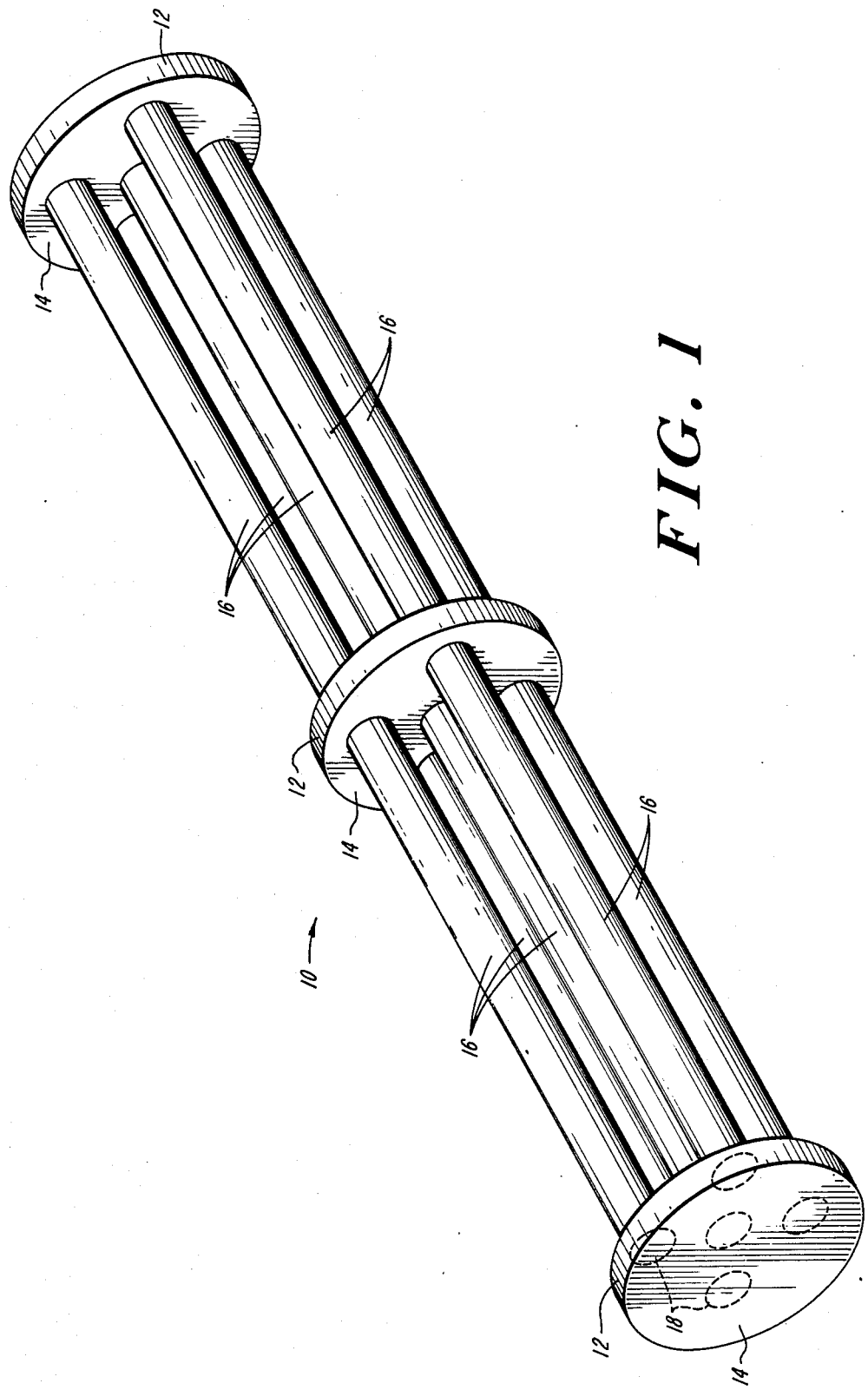

PROCESS FOR SINTERING EXTRUDED POWDER SHAPES

CROSS-REFERENCE TO RELATED APPLICATIONS

This application is a continuation-in-part of applicants' copending application Ser. Nos. 718,374, filed on Apr. 1, 1985, entitled "System for Preventing Decomposition of Silicon Carbide Articles During Sintering"; 718,375, filed on Apr. 1, 1985 entitled "Plasma Arc Sintering of Silicon Carbide"; and 718,376, filed on Apr. 1, 1985 entitled "Plasma Heated Sintering Furnace", the teachings of which are incorporated herein by reference.

BACKGROUND OF THE INVENTION

This invention relates to an improved process for drying, calcining, and sintering extruded powder materials. The process yields high strength sintered materials and substantially reduces process times and costs.

In the prior art, extruded powder shapes are generally dried or calcined by heating the extruded shapes in furnaces or kilns at low temperatures. The shapes are then sintered at higher temperatures in fossil-fueled furnaces or electric kilns. Materials such as carbides, which cannot be exposed to air and/or the products of fossil fuel combustion, are generally sintered in electric furnaces. Drying and sintering silicon carbide extruded shapes using prior art methods often requires lengthy process times of between 10–100 hours, and high energy costs and requirements.

Extruded tubes are normally sintered in the prior art in tube furnaces. The push speed of the tubes through such furnaces is normally about 3/16 inches/minute. To sinter more than one tube at a time, holes are typically bored in a solid rod material such as graphite and the tubes are loaded into these holes in the rod. The loaded rod assembly is then pushed through the tube furnace. This method results in low green/furnace load ratios and slow pushing speeds because of heat transfer limitations.

SUMMARY OF THE INVENTION

The process of the invention comprises drying or calcining an extruded powder material shape and rapid sintering the extruded shape in a plasma fired furnace. Use of the process of the invention yields high strength products and reduces process time and costs.

In the process of the invention, extruded metallic or nonmetallic powder shapes are dried or calcined. The preferred method of drying or calcining is the use of microwave radiation. Alternatively, the exhaust from the plasma fired furnace may be used to calcine or dry the extruded shapes. Calcining occurs at higher temperatures than drying, so the extruded shape must be subjected to higher amounts of microwave radiation when calcining is desired. Use of microwave radiation decreases the drying and calcining times and energy requirements.

The dried or calcined extruded shape is sintered in a plasma fired furnace, in accordance with the invention. The preferred sintering furnace is a tube furnace, such as a graphite resistance tube furnace. The sintering method may be continuous or intermittent. Use of plasma gases for sintering increases the strength of the final product over that of prior art sintered products.

The preferred powder material used in the process of the invention is silicon carbide. Silicon carbide is preferably sintered in an oxygen-free atmosphere, such as in argon, nitrogen, or helium. The sintering temperature of silicon carbide is above 1900° C., and preferably 2325° C., when utilizing a nitrogen atmosphere. The preferred minimum sintering time for sintering silicon carbide at 2325° C. is 15 minutes. The heating rate of a tube furnace for silicon carbide is preferably greater than 2000° C./hour, and the push rate is preferably greater than 3 inches/minute. Although the extruded shape in the preferred embodiment is composed of silicon carbide, other ceramic materials, such as $Si_3N_4$ or $SiC-TiB_2$, may also be utilized as is, of course, obvious to those skilled in the art.

The preferred extruded shape in the process of the invention is a tube. Typical tube wall thicknesses are 0.1–0.5 inches. Each green tube of silicon carbide is enclosed in a thin walled graphite tube and then pushed through the furnace. Silicon gas produced upon decomposition of the silicon carbide green body during sintering is therefore maintained within the graphite tube. This supersaturation of the silicon vapor phase retards or prevents further decomposition of silicon carbide as is disclosed in applicants' copending application, U.S. Ser. No. 843,788 filed Mar. 25, 1986 (attorney's docket No. SCP-107CI), entitled "System for Preventing Decomposition of Silicon Carbide Articles During Sintering", to Kim et al. Even while processing multiple tubes, the bundle consists of individual green tubes enclosed in their corresponding thin walled graphite tubes. Multiple tubes may be sintered simultaneously in a tube furnace in accordance with the invention, by fastening one end of each of several tubes to holding means, and fastening the other end of the tubes to a second holding means to form an assembly. The tubes are preferably positioned parallel to each other with a space around each tube. The tube assembly is pushed through the tube furnace to achieve sintering. Other extruded shapes, in addition to tubes, may be affixed to holding means for sintering in a tube furnace.

Accordingly, it is an object of the invention to provide a rapid, inexpensive and flexible process for the drying and sintering of extruded powder material shapes, by reducing process times and energy requirements, and by increasing the green/furnace load ratio.

It is a further object of the invention to produce a high strength sintered extrusion product.

Other objects and further scope of applicability of the present invention will become apparent from the detailed description to follow, taken in conjunction with the accompanying drawing.

BRIEF DESCRIPTION OF THE DRAWING

The sole FIGURE of the drawing is a perspective view of extruded tubes affixed to disc-shaped holding means.

DESCRIPTION OF THE PREFERRED EMBODIMENT

This invention relates to an improved process for drying or calcining and sintering extruded powder shapes comprising drying or calcining the extruded shape in a microwave furnace and rapid sintering the shape in a plasma fired furnace. Use of the process substantially reduces process times and costs and yields a high strength product.

At the outset the invention is described in its broadest overall aspects with a more detailed description following. In the process of the invention, an extruded powder shape is dried or calcined. The preferred powder material is silicon carbide. The preferred method of drying and calcining is utilizing microwave radiation. The dried or calcined shape is enclosed within a graphite shroud and then rapid sintered in a plasma fired furnace. For tube-shaped extruded materials, the preferred furnace is a tube furnace. The tube furnace must be long enough and/or the heating rates of the furnace high enough so that the sintering temperature is reached. The optimum sintering temperature for silicon carbide treated in a nitrogen atmosphere is approximately 2325° C. with a minimum sintering time of approximately 5 minutes. In sintering silicon carbide tubes, the heating rate of the furnace is preferably greater than 2000° C./hour, and the push rate preferably greater than 3 inches/minute. To sinter several tubes simultaneously, ends of the tubes are held by several holding means to form an assembly. The assembly is then pushed through the tube furnace to achieve sintering. The final sintered product has a high tensile strength and density.

The process of the invention is preferably used for silicon carbide extruded powder shapes, although the process can be used for any metallic or nonmetallic extruded powder shapes which require sintering. The shapes may be extruded by any means, common to the art, with or without binders. The process of the invention is especially useful for elongated shapes such as tubes which can be sintered in a tube furnace.

The green extruded shape is dried or calcined in accordance with the process of the invention. This step serves to drive off moisture and other volatiles and eliminates excessive shrinkage during the sintering step to yield a higher quality product. Drying requires lower temperatures than calcining. Drying drives off moisture present in the green extruded shape whereas calcining additionally drives off volatile chemically combined constituents. The preferred method of drying or calcining is the use of a microwave furnace which utilizes high frequency radiation. By this process, electric field energy is converted into heat within the material being dried. Drying or calcining extruded materials using prior art infrared radiation heating methods requires a long time because of the dependence on thermal conduction from the outside of the material layers and because of generally poor conductive outer layers. The use of microwave radiation shortens the drying and calcining times because the microwaves penetrate to the interior of the material. Additionally, microwave drying and calcining drives off water and volatile constituents without shrinkage of the green extruded shape. To dry or calcine extruded shapes using microwave radiation, the shapes should be passed or conveyed through the region having the maximum electric field. Several passes through the field are generally necessary in order to dry slowly a green extruded shape with calcining obviously requiring additional passes.

After drying or calcining, the extruded shape is placed within a graphite shroud and then sintered in a plasma fired furnace, in accordance with the invention. The high heat transfer rates associated with plasma heated gases significantly reduces the sintering time of the extruded shape as compared to conventional methods. Plasma arc fired gases differ greatly from ordinary furnace heated gases in that they contain electrically charged particles capable of transferring electricity and heat. The gases become ionized or dissociated and highly reactive. The ionization or dissociation of the plasma gas greatly increases the sintering rate. A plasma gas can be "superheated" to temperatures well above the sintering temperature to effect ionization or dissociation; the extruded shape is directly heated by the plasma gas to a much lower temperature.

Sintering of carbides, such as silicon carbide, should be performed in the absence of oxygen or oxygen-bearing gases, such as water and carbon dioxide, to prevent the formation of oxides which may have inferior physical and chemical properties. Thus, in the prior art, electric furnaces rather than fossil-fueled furnaces are utilized for sintering carbides. A plasma gas is useful for sintering carbides since an inert or nonreactive gas may be easily utilized. Useful plasma gases for sintering silicon carbide are argon, nitrogen or helium, or a combination thereof. Nitrogen gas dissociates into a highly reactive mixture of $N_2$-molecules, N-atoms, $N^+$-ions and electrons when subjected to a plasma arc. Argon and helium gases ionize rather than dissociate when subjected to a plasma arc. The sintering temperature of silicon carbide is above 1900° C., and preferably 2325° C. when sintered in a nitrogen atmosphere. The minimum sintering time for silicon carbide at 2325° C. is approximately 15 minutes.

The use of plasma gases in the process of the invention increases the strength of the final product over that of prior art products. Densities are comparable to prior art product densities.

The preferred plasma fired furnace useful in the process of the invention is a tube furnace, such as a graphite resistance tube furnace. In a tube furnace, the extruded shape is pushed through the length of the furnace where it is subjected to a plasma gas reaction zone. The length of the furnace, the heating rate and the push rate depend on the minimum sintering temperature and time requirements of the particular extruded material. For example, to sinter a 6' silicon carbide tube of 0.1 inch wall thickness at 2325° C. in 15 minutes (preferred heat-up and holding time), the heating rate must be 9300° C./hour and the push rate approximately 5 inches per minute. In this situation, the length of the tube furnace is slightly longer than the length of the tube in order to introduce cooling gases at the end of the furnace. If one desires to use a heating rate of 2000° C./hour and a push rate of 5 inches per minute, the extruded shape has to be sintered for approximately 45 minutes, and the furnace hot zone has to have a minimum length of approximately 19 feet. As can be seen, the heating rate, push rate and furnace length can all be varied to a great extent depending on the extruded powder material and shape and desired process conditions. The process of the invention allows a great deal of flexibility in determining these process conditions. The heating rate for silicon carbide is preferably greater than 2000° C./hour, and the push rate is preferably greater than 3 inches/minute.

The pushing method through a tube furnace may be continuous, intermittent, or a combination thereof, in accordance with the invention. For example, the extruded shape may be pushed continuously through the furnace until the sintering temperature is reached, and then held at this position for a sufficient time to achieve sintering.

In order to optimize convective heat transfer of the plasma gases in a tube furnace, the graphite tubes enclosing the silicon carbide tubes should be separated from one another. In the preferred process of the invention 10 utilizing a tube furnace, the ends of the graphite tube are affixed to holding means 12 made of a material such as graphite, to form an assembly which is pushed through the tube furnace during sintering. The holding means "hold" the graphite tubes in place, keep the graphite tubes from contacting the furnace walls, and allow exposure of the graphite tubes to the plasma gases during sintering. The preferred holding means shape in the process of the invention is a flat disc 14. Numerous other shapes may be utilized as holding means, such as hemispheres, struts, square shapes and hexagon shapes. The shape utilized must be able to pass easily through a tube furnace. It is preferable, but not essential, to position the faces of axes formed by the holding means parallel to each other in the assembly.

The preferred extruded shape for the process of the invention is a tube 16. Typical wall thicknesses for tubes 16 are approximately 0.075 inches. An assembly for simultaneously sintering multiple tubes is illustrated in the drawing. The disc-shaped holding means 14 in the drawing are perforated 18 to allow insertion of the ends of the tubes. Other means of fastening the graphite tubes 16 to the holding means may be utilized, such as providing a slot or protrusion for the shape to fit into. Preferably, the tubes are positioned parallel to each other and perpendicular to the holding means 12. And preferably, a space is left between the tubes to provide for exposure to the plasma gases during sintering. The drawing also illustrates an assembly comprising tubes affixed to three disc-shaped holding means. The number of tubes which can be positioned between holding means is dependent upon the diameter of the tubes and the tube furnace. Other extruded shapes besides tubes can be processed in accordance with the invention. The invention is especially useful for extruded shapes in which the length to width ratio is high. The invention is also useful for any shapes in which continuous sintering is desired. The shapes are affixed to various holding means to form an assembly which can be pushed through a tube furnace; one end of the extruded shape is fastened to one holding means and the other end is fastened to a second holding means. Use of such holding means results in a high green/furnace load ratio, and thus lower process times and costs.

The invention is further illustrated by the following nonlimiting example.

EXAMPLE 1

Six tubes of extruded alpha silicon carbide, having a length of 6', an outer diameter of 1", and an inner diameter of 0.7" were dried in a microwave furnace. The tubes were placed abreast and subjected to 12 passes at a power setting of 1.6 kw and a belt speed of one ft/min. The retention time during each pass was 6 minutes. The tubes lost 19% of their weight during the microwave treatment. Three of the dried tubes were calcined by subjecting the tubes to two more passes at a power setting of 2 kw and a belt speed of 18 in/min. The maximum temperature measured on the surface of the tubes was 470° F. The dried and calcined tubes were cut into 14" lengths and fired by standing the tubes vertically in a plasma batch furnace. The heating rate was 3200° C./hour and the tubes were held at 2325° C. for 15 minutes. Table I shows the density and tensile strength of the sintered tubes. All of the tubes passed a leak test. The tensile strength of some of the tubes exceeds that of prior art sintered silicon carbide tubes (10,000 psi).

TABLE I

Properties of Sintered Silicon Carbide Tubes

| Microwave Treatment | Density (g/cm$^3$) | Leak Test | Max. Tensile Strength (psi) |
|---|---|---|---|
| Dried | 2.997 | Passed | 14,000 |
| Dried | 2.984 | Passed | 6,200 |
| Dried | 2.999 | Passed | 15,300 |
| Dried | 2.992 | Passed | 8,900 |
| Dried | 2.990 | Passed | 17,000 |
| Dried | 2.992 | Passed | 5,500 |
| Calcined | 3.025 | Passed | * |
| Calcined | 3.036 | Passed | * |
| Calcined | 3.031 | Passed | 19,100 |
| Calcined | 2.914 | Passed | 9,500 |
| Calcined | 2.924 | Passed | 16,000 |
| Calcined | 2.921 | Passed | * |

*Tube broke during testing

Accordingly, an improved process for drying and sintering extruded powder material shapes has been discovered. The process of the invention significantly reduces process times and costs and yields high strength products.

Although the invention has been described with reference to its preferred embodiment, other embodiments can achieve the same results. Variations and modifications of the present invention will be obvious to those skilled in the art and it is intended to cover in the appended claims all such modifications and equivalents.

We claim:

1. A process for sintering extruded powder materials comprising the following steps:
    (a) drying or calcining an extruded powder shape;
    (b) enclosing said extruded powder shape within a graphite shroud;
    (c) affixing the ends of said graphite shroud to a holding means to form an assembly by fastening one end of said graphite shroud to one holding means, and fastening the other end of said graphite shroud to a second holding means; and
    (d) rapid sintering said graphite enclosed extruded shape in a plasma fired tube furnace.

2. A process in accordance with claim 1 wherein said extruded shape is dried or calcined in a microwave furnace.

3. A process in accordance with claim 1 wherein said extruded shape is dried or calcined by the exhaust from the plasma fired furnace.

4. A process in accordance with claim 1 wherein said holding means comprise flat discs.

5. A process in accordance with claim 4 wherein the diameter of said discs is less than the diameter of said tube furnace.

6. A process in accordance with claim 4 wherein the faces of said discs are positioned in parallel to each other within said assembly.

7. A process in accordance with claim 1 wherein said fastening comprises inserting the ends of said graphite shroud into perforations in said holding means.

8. A process in accordance with claim 1 wherein said assembly is pushed through said tube furnace during sintering.

9. A process in accordance with claim 8 wherein said assembly is pushed through said tube furnace in a continuous manner.

10. A process in accordance with claim 8 wherein said assembly is pushed through said tube furnace in an intermittent manner.

11. A process in accordance with claim 1 wherein said extruded shape comprises a tube.

12. A process in accordance with claim 11 wherein said tube is enclosed within a graphite tube.

13. A process in accordance with claim 11 wherein a plurality of tubes are simultaneously sintered in a plasma fired furnace.

14. A process in accordance with claim 13 wherein prior to said sintering step the ends of said graphite tubes are affixed to holding means to form an assembly by fastening one end of each of said graphite tubes to one holding means, and fastening the other end of each of said graphite tubes to a second holding means.

15. A process in accordance with claim 14 wherein said holding means comprise flat discs.

16. A process in accordance with claim 15 wherein the diameter of said discs is less than the diameter of said tube furnace.

17. A process in accordance with claim 15 wherein the faces of said discs are positioned in parallel to each other within said assembly.

18. A process in accordance with claim 17 wherein said graphite tubes are positioned at a perpendicular angle to the faces of said discs.

19. A process in accordance with claim 14 wherein said fastening comprises inserting the ends of said graphite tubes into perforations in said holding means.

20. A process in accordance with claim 14 wherein said graphite tubes are positioned so that they do not touch each other or the walls of said tube furnace during sintering.

21. A process in accordance with claim 14 wherein said assembly is pushed through said tube furnace during sintering.

22. A process in accordance with claim 21 wherein said assembly is pushed through said tube furnace in a continuous manner.

23. A process in accordance with claim 21 wherein said assembly is pushed through said tube furnace in an intermittent manner.

24. A process in accordance with claim 1 wherein said extruded shape is selected from the group consisting of silicon carbide, silicon nitride, or silicon carbide-titanium boride composite.

25. A process in accordance with claim 24 wherein said extruded shape comprises a silicon carbide tube.

26. A process in accordance with claim 25 wherein said extruded silicon carbide tube is sintered at a heating rate of greater than 2000° C./hour and a push rate of greater than 3 inches/minute.

27. A process for sintering extruded silicon carbide tubes in a plasma fired tube furnace comprising the following steps:
  (a) drying or calcining extruded silicon carbide tubes in a microwave furnace;
  (b) enclosing said silicon carbide tubes within thin-walled graphite tubes;
  (c) affixing the ends of said graphite tubes to holding means to form an assembly by fastening one end of each of said graphite tubes to one holding means, and fastening the other end of each of said graphite tubes to a second holding means; and,
  (d) sintering said tubes in a plasma fired tube furnace having a heating rate of greater than 2000° C./hour by pushing said assembly through said plasma fired tube furnace at a push rate of greater than 3 inches/minute.

28. A silicon carbide tube produced in accordance with the following steps:
  (a) drying or calcining an extruded silicon carbide tube in a microwave furnace; and,
  (b) sintering said tube in a plasma fired tube furnace having a heating rate of greater than 2000° C./hour by pushing said tube through said tube furnace at a push rate of greater than 3 inches/minute.

* * * * *